United States Patent [19]

Shimotoyodome

[11] Patent Number: 5,461,502
[45] Date of Patent: Oct. 24, 1995

[54] METHOD AND APPARATUS FOR FEEDING LIQUID CRYSTAL WITH A ROTATABLE SUPPORT MEANS

[75] Inventor: Gyo Shimotoyodome, Tokyo, Japan

[73] Assignee: Beldex Corporation, Tokyo, Japan

[21] Appl. No.: 253,348

[22] Filed: Jun. 3, 1994

[30] Foreign Application Priority Data

Apr. 6, 1994 [JP] Japan .................................. 6-090699

[51] Int. Cl.⁶ ............................. G02F 1/13; G02F 1/1335
[52] U.S. Cl. ............................................... 359/62; 359/36
[58] Field of Search ........................................ 359/62, 36

[56] References Cited

U.S. PATENT DOCUMENTS

| | | | |
|---|---|---|---|
| 5,241,995 | 9/1993 | Farrell | 141/4 |
| 5,355,236 | 10/1994 | Mitsui | 359/62 |

FOREIGN PATENT DOCUMENTS

| | | |
|---|---|---|
| 55-135618 | 10/1980 | Japan . |
| 62-141516 | 6/1987 | Japan . |
| 2-81022 | 3/1990 | Japan . |
| 5-203969 | 8/1993 | Japan . |
| 682740 | 3/1994 | Japan . |

OTHER PUBLICATIONS

Patents Abstracts of Japan, P-630, Oct. 29, 1987, vol. 11/No. 331, Optrex Corp.

Patent Abstracts of Japan, P-376, Jul. 27, 1985, vol. 9/No. 182, Suwa Seikosha K.K.

*Primary Examiner*—Anita Pellman Gross
*Assistant Examiner*—Charles Miller
*Attorney, Agent, or Firm*—Evenson, McKeown, Edwards & Lenahan

[57] ABSTRACT

An apparatus for feeding a liquid crystal includes a support member having a rotational axis and capable of rotating about the rotational axis. A thin container is supported by the support member. In that supporting condition, an air discharge port of the container is near to the rotational axis, a liquid crystal feed port is away from the rotational axis, and the air discharge port is open to the atmosphere. The liquid crystal is fed through the feed port while rotating the support member about the rotational axis. Rotation of the support member causes a centrifugal force to be applied to a leading edge of the liquid crystal which has been fed in the container, the direction of the centrifugal force being reverse to a proceeding direction of the leading edge.

4 Claims, 3 Drawing Sheets

(PRIOR ART)

METHOD AND APPARATUS FOR FEEDING LIQUID CRYSTAL WITH A ROTATABLE SUPPORT MEANS

BACKGROUND OF THE INVENTION

This invention relates to a method and an apparatus for feeding a liquid crystal.

As is known, a liquid crystal display unit is constituted by filling a liquid crystal in a container having a thin internal space. As disclosed in Japanese Laid-Open Patent Application No. 62-141516, according to a typical method for feeding a liquid crystal, air contained in an internal space of a container is discharged from an air discharge port to evacuate the container, and then a liquid crystal is fed into the internal space through a feed port of the container. The liquid crystal thus fed is filled in the container owing to the effect of a vacuum drawing operation and capillary action. However, since this method requires a vacuum drawing apparatus, the costs for manufacturing the liquid crystal display unit are high. It also has the shortcomings that due to vacuum drawing, a solvent, etc. contained in the liquid crystal are susceptible to volatilization, and therefore viscosity of the liquid crystal is increased, and eventually the time for filling the liquid crystal is increased.

In order to overcome the above shortcomings, the present inventor has developed a method for feeding a liquid crystal, in which a liquid crystal is fed by a centrifugal force and by a compression air pressure in accordance with necessity, through a feed port of a container while opening an air discharge port of the container to the atmosphere (Japanese Laid-Open Patent Application No. 6-82740 laid open Mar. 25, 1994). However, this method still has the shortcomings that in the case where the internal space of the container is made so thin as several µm (for example, 3 µm), air bubbles remain in the container. Specifically, as shown in FIG. 6, a liquid crystal L fed in the internal space of the container is caused to have a plurality of tentacles or fingers La by capillary action. When the fingers La are branched and grown to unite adjacent fingers La, air bubbles remain between the adjacent fingers La. Attention should be paid to the fact that according to this method, an acting direction of the centrifugal force is the same to a proceeding direction of a leading edge of the liquid crystal in the container.

SUMMARY OF THE INVENTION

It is therefore an object of the present invention to provide a method and an apparatus for feeding a liquid crystal, in which the time for filling the liquid crystal is comparatively short and no air bubbles are allowed to remain in the liquid crystal.

According to the present invention, there is provided a method for feeding a liquid crystal into a thin internal space of a container through a feed port connected to one end of the internal space, the other end of the internal space being connected to an air discharge port of the container, the method comprising the steps of:

(a) feeding the liquid crystal through the feed port in the condition that the air discharge port of the container is open to the atmosphere and such opened air discharge port is located nearer to a rotational axis than from the feed port; and (b) rotating the container about the rotational axis simultaneously when the liquid crystal is fed, thereby applying a centrifugal force to a leading edge of the liquid crystal in a reverse direction to a proceeding direction of the leading edge.

From another aspect of the invention, there is also provided an apparatus for feeding a liquid crystal into a thin internal space of a container through a feed port connected to one end of the internal space, the other end of the internal space being connected to an air discharge port of the container, the apparatus comprising:

(a) liquid crystal feed means for feeding the liquid crystal into the feed port;

(b) rotatable support means having a rotational axis and supporting the container in the condition that the air discharge port is located nearer to the rotational axis than from the feed port and open to the atmosphere; and (c) drive means for rotating the support means about the rotational axis to cause the container to rotate about the rotational axis, thereby applying a centrifugal force to a leading edge of the liquid crystal in a reverse direction to a proceeding direction of the leading edge.

DETAILED DESCRIPTION OF THE EMBODIMENTS

Figure 1:
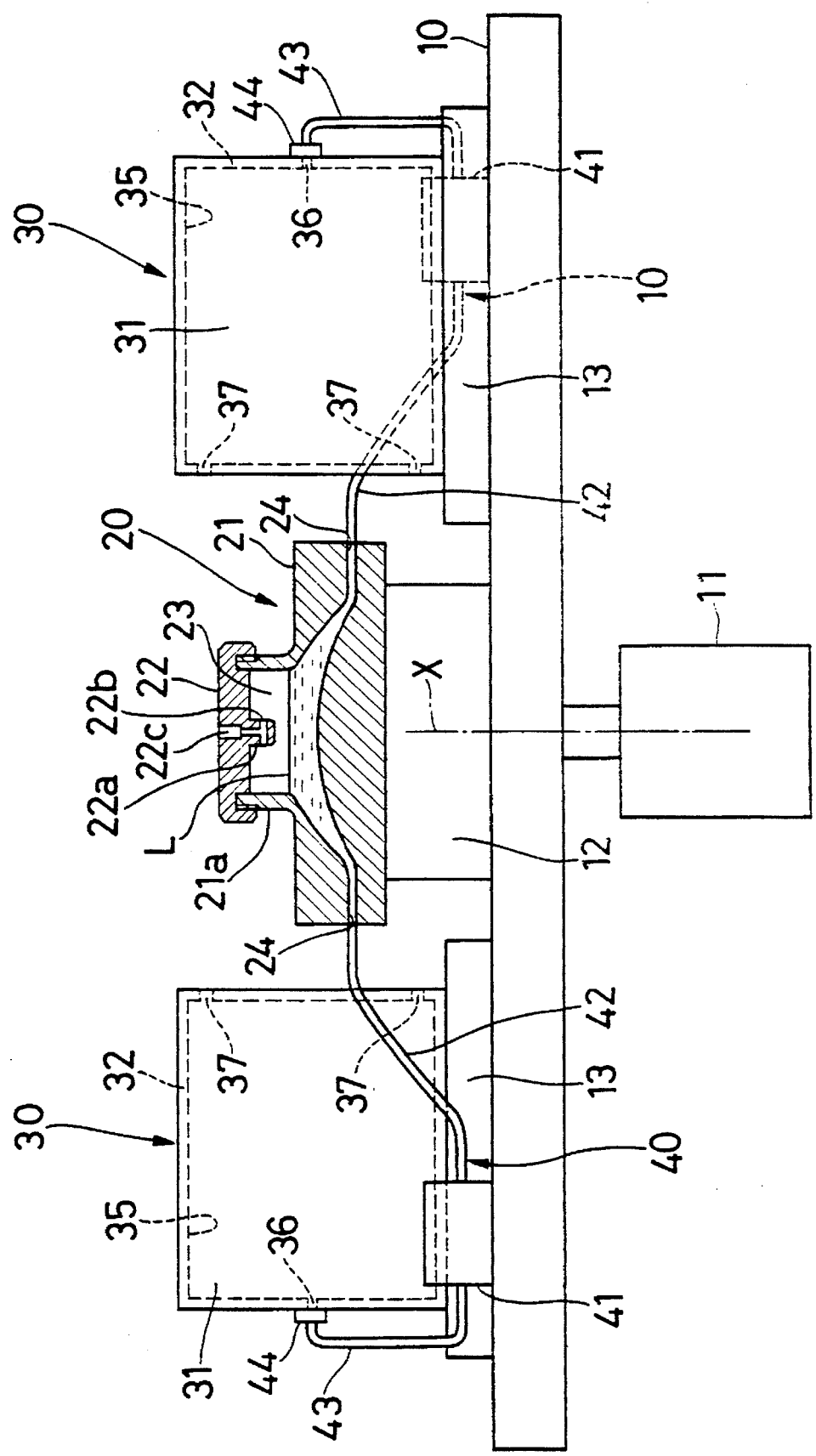
FIG. 1 is a front view, partly in section, of an apparatus for feeding a liquid crystal according to one embodiment of the present invention.
Figure 2:
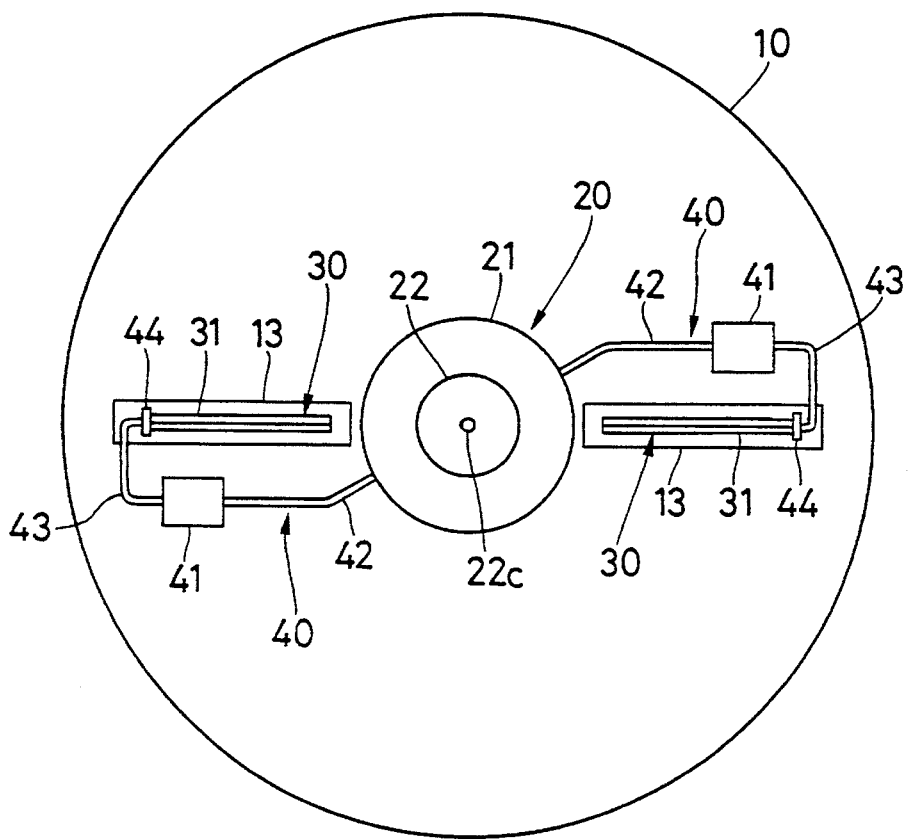
FIG. 2 is a plan view of the above.

One embodiment of the present invention will be described hereinafter with reference to FIGS. 1 to 3. In FIGS. 1 and 2, reference numeral 10 denotes a round turn table (support means). This turn table 10 is rotatably supported by a guide, not shown, for rotation about a vertically-extending axis X. The turn table 10 is rotated by a motor 11 (drive means). A support table 12 is provided on a center (on the rotational axis X) of an upper surface of the turn table 10, and a plurality (one pair in this embodiment) of support tables 13 are provided on the upper surface away from the center. The pair of support tables 13 are placed opposite to each other with the support table 12 therebetween and are allowed to extend in a radial direction of the turn table 10.

On an upper surface of the support table 12, a liquid crystal reservoir tank 20 is removably supported by support means not shown. The center of the reservoir tank 20 is disposed on the rotational axis X. This reservoir tank 20 includes a body 21 having a neck portion 21a, and a cap 22 threadedly engaged with and for closing an opening of the neck portion 21a. A projection 22a is formed on the center of a lower surface of the cap 22. An inverted T shaped passageway 22b is formed in the projection 22a. A threaded hole 22c is formed in the center of an upper surface of the cap 22. The threaded hole 22c is communicated with an internal space 23 of the reservoir tank 20 through the passageway 22b. Also communicated with the internal space 23 are a pair of outlet ports 24 open to a peripheral surface of the body 21.

A plate-like container 30 having a flat and rectangular outer appearance is removably placed on each support table 13 by support means, not shown, in such a manner as to stand on the support table 13. The container 30 is obtained by sealingly attaching peripheral edges of a couple of glass sheets 31 with an adhesive agent. Each container 30 has a very thin (for example, 3 μm) internal space 35. A feed port 36 is formed in the center of one end face of the container 30, and two air discharge ports 37 are formed in the other end face at location near to each corner. The container 30 is placed on the turn table 13 in such a manner as to extend in a radial direction of the turn table 13. It is important here to note that in this arrangement, the air discharge ports 37 are near to the rotational axis X and the feed port 36 is remote from the rotational axis X. The air discharge ports 37 are open to the atmosphere.

The pair of outlet ports 24 of the reservoir tank 20 are communicated with the feed ports 36 of the pair of containers 30 through a pair of passageway means 40, respectively. Each passageway means 40 includes an auxiliary tank 41 and two tubes 42 and 43. The auxiliary tanks 41 are removably supported on the upper surface of the turn table 10 at those locations comparatively remote from the rotational axis X, but nearer to the X axis than from the feed port 36. The first tubes 42 are allowed to connect the outlet ports 24 of the reservoir tank 20 with the auxiliary tanks 41, respectively. The second tubes 43 are allowed to connect the auxiliary tanks 41 with the feed ports 36 of the containers 30, respectively. The tubes 43 are easily removably connected to the feed ports 36 through connectors 44 (which are schematically illustrated in FIGS. 1 and 2), respectively.

In the above-mentioned construction, the liquid crystal L is preliminarily filled in the internal space 23 of the reservoir tank 20 and the auxiliary tanks 41 and tubes 42 and 43 of the passageway means 40. Distal ends of the tubes 43 are connected respectively to the feed ports 36 of the containers 30 placed on the support tables 13 in the manner as described. Then, the motor 11 is actuated to rotate the turn table 10.

During rotation of the turn table 10, the liquid crystals L contained in the auxiliary tanks 41 are fed to the internal spaces 35 of the containers 30 through the tubes 43, respectively. Feed pressure for the liquid crystal L is generated by a centrifugal force which acts on the liquid crystal L accumulated in the reservoir tank 20 and passageway means 40 in accordance with rotation of the turn table 10.

Since the internal spaces 35 are not vacuum and volatilization of the solvent contained in the liquid crystal L is restrained, the viscosity of the liquid crystal L is maintained comparatively low. Owing to this comparatively low viscosity of the liquid crystal L and also to the feed pressure generated by the centrifugal force, the liquid crystal L is filled in the internal space 35 of each container 30 in a short time.

Figure 3:
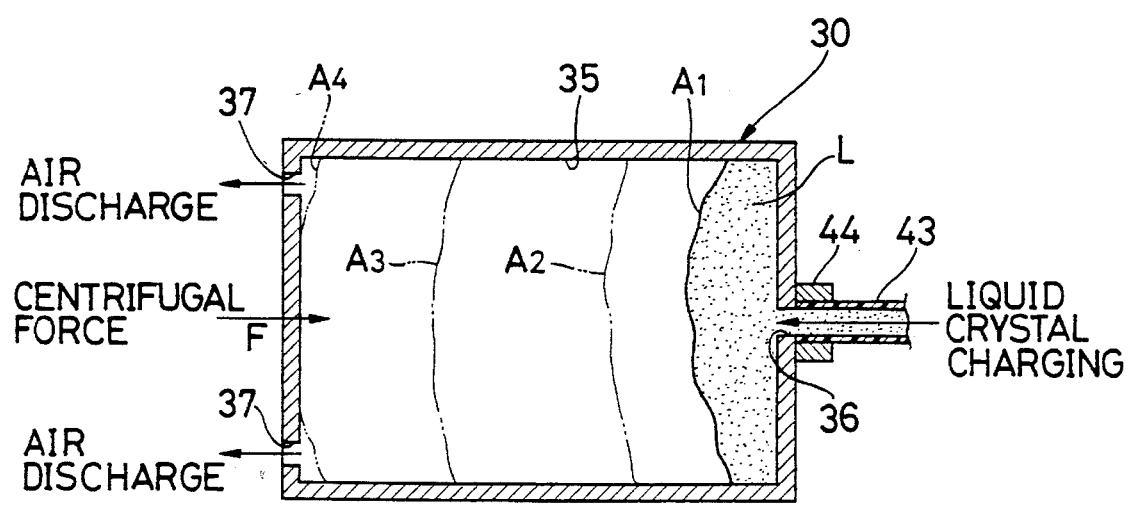
FIG. 3 is a sectional view showing the manner for feeding a liquid crystal according to the above apparatus.
Figure 6:
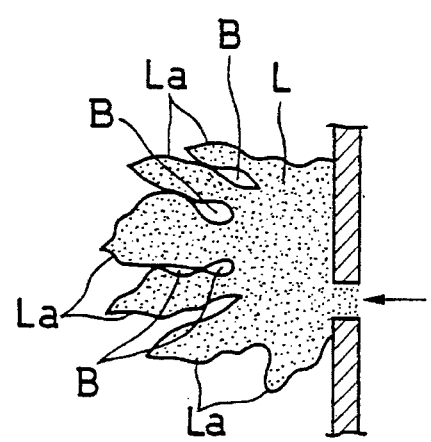
FIG. 6 is a sectional view showing the manner for feeding a liquid crystal when a centrifugal force does not act in a direction reverse to a progressing direction of a leading end of the liquid crystal.

FIG. 3 shows a state of filling of the liquid crystal L with the passage of time. That is, reference characters $A_1, A_2, A_3$ and $A_4$ show how the leading edge of the liquid crystal L proceeds in the internal space 35. The shape of the leading edge of the liquid crystal L is somewhat protruded at its central portion and comparatively smooth as a whole, and the fingers La of FIG. 6 are not formed. Therefore, there occurs no such inconvenience as that air bubbles remain in the liquid crystal L. The reason is presumed that growth of the fingers under the effect of the capillary action is prevented by a centrifugal force F acting on the liquid crystal L in a reverse direction to the growing direction of the fingers.

As the leading edge of the liquid crystal L proceeds toward the air discharge ports 37 of each internal space 35, the air in the internal space 35 is discharged from the air discharge ports 37. Before long, the liquid crystal L reaches the air discharge ports 37, and the filling of the liquid crystal L in each internal space 35 is thus finished.

When the filling of the liquid crystal L is finished, the motor 11 is stopped, the connectors 44 are removed from the feed ports 36 respectively, and the feed ports 36 and air discharge ports 37 are blocked with seal members, not shown. In order to prevent the liquid crystal L from leaking from distal ends of the tubes 43, it is preferable to plug the threaded hole 22c of the reservoir tank 20 before the connectors 44 are removed.

In the case where the containers 30 are larger in size and the air discharge ports 37 are located near to the rotational axis X in the above embodiment, it becomes difficult for the liquid crystal L to proceed when the leading edge of the liquid crystal L approaches the air discharge ports 37. The reason is that when the leading edge of the liquid crystal L approaches the rotational axis X, the force for proceeding the liquid crystal L is generated chiefly by the effect of capillary action and the proceeding force becomes generally equal to the reverse centrifugal force F. A simple solution for this problem is to decrease the rotating speed of the turn table 10 when the leading edge of the liquid crystal L approaches the air discharge ports 37. By doing this, the leading edge of the liquid crystal L can reach the air discharge ports 37 under the effect of capillary action.

In the case where the containers 30 are small in size and sufficiently away from the rotational axis X, it is not necessary to decrease the rotating speed of the turn table 10. In this case, a high feed pressure is generated by the centrifugal force acting on the liquid crystal L in the reservoir tanks 20 and passageway means 40 and this feed pressure coacts with the capillary action to force the leading edge of the liquid crystal L to proceed.

In the above embodiment, since the air discharge ports of the containers are open to the atmosphere and the vacuum drawing is not effected, no vacuum drawing apparatus is needed and therefore manufacturing costs of the liquid crystal display unit can be decreased.

Figure 4:
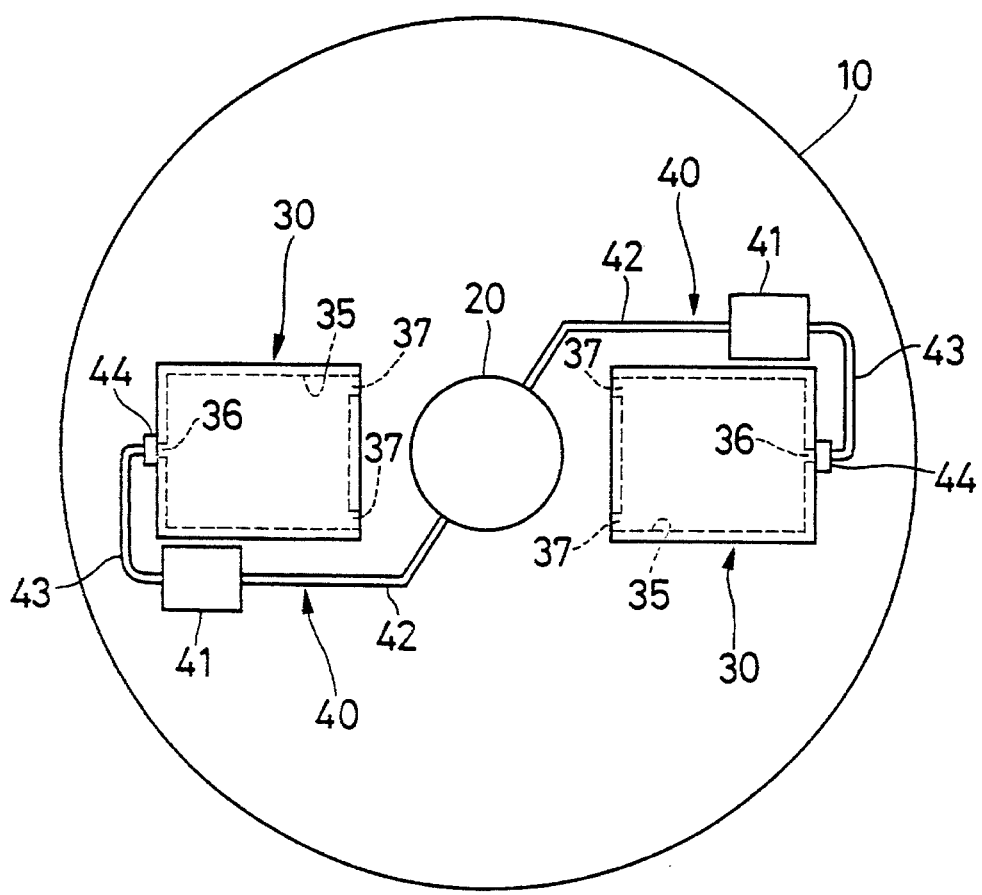
FIG. 4 is a plan view of an apparatus for feeding a liquid crystal according to another embodiment of the present invention.

FIG. 4 shows another embodiment of the present invention. In this embodiment, the containers 30 are in parallel with the upper surface of the turn table 10. Since the remaining construction is generally the same as the above embodiment, like parts are represented by like reference numerals in FIG. 4 and description thereof is omitted. In this embodiment, the liquid crystal can be fed generally in the same manner as in the above embodiment.

Figure 5:
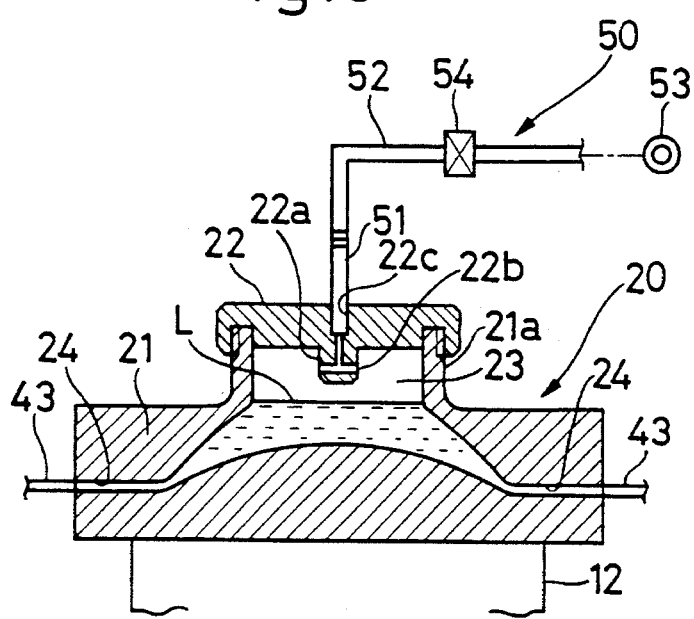
FIG. 5 is a front view, partly in section, of an apparatus for feeding a liquid crystal according to a third embodiment of the present invention.

FIG. 5 shows a third embodiment of the present invention. This embodiment employs compression air feed means 50 for feeding a compression air through the threaded hole 22c of the cap 22 of the reservoir tank 20. This compression air feed means 50 comprises a short tube 51 whose lower end portion is threaded into the threaded hole 22c, a feed tube 52 whose one end portion is rotatably connected to an upper end portion of the short tube 51, a compression air source 53 connected to the other end of the feed tube 52, and a valve 54 formed in an intermediate portion of the feed tube 52. In this embodiment, upon rotation of the turn table 20, the valve 54 is opened to feed the compression air into the reservoir tank 20, so that pressure of this compression air can also be utilized as a liquid crystal feed pressure. Owing to this arrangement, the time for filling the liquid crystal can be reduced.

The present invention is not limited to the above embodiments and many changes can be made. For example, the auxiliary tanks may be omitted in the respective embodiments of FIGS. 1 through 3, FIG. 4, and FIG. 5.

What is claimed is:

1. A method for feeding a liquid crystal into a thin internal space of a container through a feed port connected to one end of said internal space, the other end of said internal space being connected to an air discharge port of said container, said method comprising the steps of:

(a) feeding the liquid crystal through said feed port in the condition that said air discharge port of said container is open to the atmosphere and such opened air discharge port is located nearer to a rotational axis than from said feed port; and (b) rotating said container about said rotational axis simultaneously when the liquid crystal is fed, thereby applying a centrifugal force to a leading edge of the liquid crystal in a reverse direction to a proceeding direction of said leading edge.

2. An apparatus for feeding a liquid crystal into a thin internal space of a container through a feed port connected to one end of said internal space, the other end of said internal space being connected to an air discharge port of said container, said apparatus comprising:

(a) liquid crystal feed means for feeding the liquid crystal into said feed port;

(b) rotatable support means having a rotational axis and supporting said container in the condition that said air discharge port is located nearer to said rotational axis than from said feed port and open to the atmosphere; and (c) drive means for rotating said support means about said rotational axis to cause said container to rotate about said rotational axis, thereby applying a centrifugal force to a leading edge of the liquid crystal in a reverse direction to a proceeding direction of said leading edge.

3. An apparatus for feeding a liquid crystal according to claim 2, in which said liquid crystal feed means includes a reservoir tank supported by said rotatable support means and disposed on said rotational axis, said reservoir tank being for reserving the liquid crystal, and communication means for communicating said reservoir tank with said feed port of said container.

4. An apparatus for feeding a liquid crystal according to claim 2, in which said liquid crystal feed means includes a reservoir tank supported by said support means and reserving the liquid crystal, communication means for communicating said reservoir tank with said feed port of said container, and means for feeding a compression air into said reservoir tank.

* * * * *